E. MAY, Jr., R. J. BULLEN AND A. VOIGT.
INSECT EXCLUDING DEVICE FOR USE ON GREENHOUSE VENTILATORS.
APPLICATION FILED JUNE 7, 1921.
1,402,241.
Patented Jan. 3, 1922.
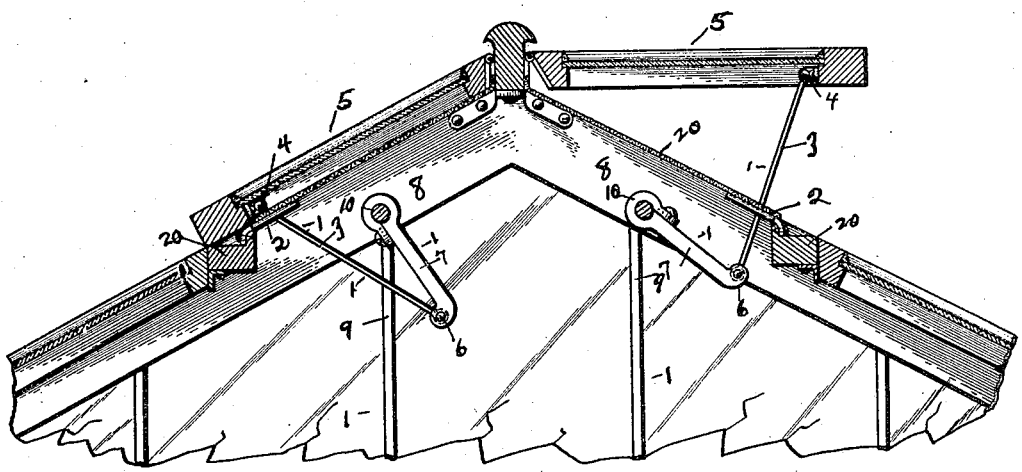
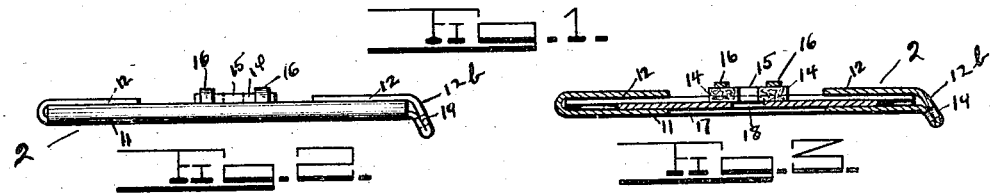
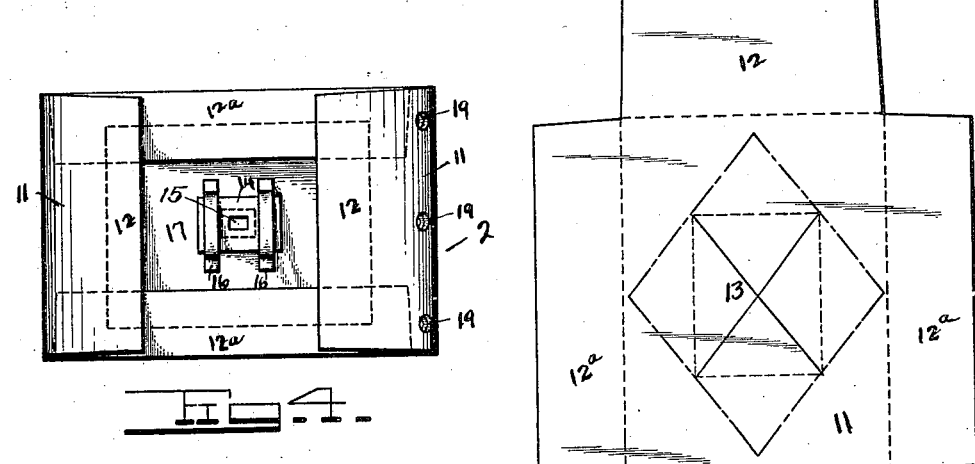
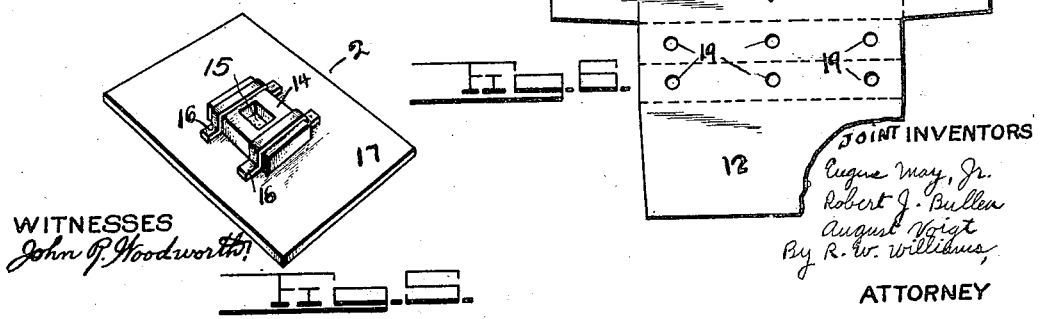
WITNESSES
John P. Woodworth
JOINT INVENTORS
Eugene May, Jr.
Robert J. Bullen
August Voigt
By R. W. Williams,
ATTORNEY

UNITED STATES PATENT OFFICE.

EUGENE MAY, JR., ROBERT J. BULLEN, AND AUGUST VOIGT, OF WASHINGTON, DISTRICT OF COLUMBIA.

INSECT-EXCLUDING DEVICE FOR USE ON GREENHOUSE VENTILATORS.

1,402,241.

Specification of Letters Patent.  Patented Jan. 3, 1922.

Application filed June 7, 1921. Serial No. 475,791.

(FILED UNDER THE ACT OF MARCH 3, 1883, 22 STAT. L., 625.)

*To all whom it may concern:*

Be it known that we, EUGENE MAY, Jr., ROBERT J. BULLEN, and AUGUST VOIGT, citizens of the United States of America, and employees of the Department of Agriculture of the United States, residing in the city of Washington, District of Columbia, (whose post-office addresses are Department of Agriculture, Washington, D. C.,) have invented a new and useful Insect-Excluding Device for Use on Greenhouse Ventilators.

This application is made under the act of March 3, 1883, ch. 143 (22 Stat., 625), and the invention herein described and claimed may be used by the Government of the United States or any of its officers or employees in the prosecution of work for the Government and also by any person in the United States either on public or private work, without payment to us of any royalty thereon. We hereby dedicate the same to the free use of the Government and the people of the United States.

The object of our invention is to provide an insect-proof device that will permit the passage of ventilator rod through copper wire cloth screening in insect-proof green houses. We attain this object by the mechanism illustrated in the accompanying drawing, the drawing showing in—

Fig. 1, a side view of the device in position on ventilators.

Fig. 2, a side view of the trap.

Fig. 3, a side sectional view of the trap.

Fig. 4, a plan view of the trap.

Fig. 5, an isometric view of the trap.

Fig. 6, a sectional top view of the body of the trap prior to assembly.

The device consists of a ventilator arm 1, and a trap 2. The ventilator arm 1 consists of a rod 3 one end 4 of which is suitably fastened to the ventilator 5 and the other end 6 of which is secured to a rocker arm 7 which in turn is affixed to the rafter 8 of the greenhouse and is actuated by the rod 9 which is affixed at end 10 of the rocker arm 7. Rod 9 extends a suitable distance to the lower part of the greenhouse and is capable of operation by hand in an upward and downward direction.

The trap 2 consists of a body 11 the ends 12 and 12$^a$ of which are folded over about one inch, said body being provided with an opening 13 in the center thereof. Over this opening 13 is a felt gasket 14 with an opening 15 in the center, said gasket being fastened by means of straps 16 to a flat piece of metal 17, also provided with an opening 18 in the center, which piece of metal 17 is positioned within the body 11 and the ends 12 and sides 12$^a$ of the body, and is adapted to slide in a horizontal direction toward either of the ends 12. One of the ends 12$^b$ is bent down at a slight angle and holes 19 punched therein for the reception of screws or nails to permit said trap to be fastened to the roof of the greenhouse. A bracing member 20 attached to the roof assists in holding the trap in position. A wire screen 20 is provided in the roof of the greenhouse for the admission of air, and it extends from a point opposite the end 12$^b$ of the trap 2 to any desired point beyond the opposite end of the trap. When the trap 2 is placed in position on the greenhouse roof the rod 3 of the ventilator arm 1 is inserted through the opening 13, 15 and 18 in the trap 2 and attached to the ventilator 5, the other members of the ventilator arm being also secured in their proper positions. When the ventilator is opened or closed the rod 3 of the ventilator arm 1 moves in an upward or downward direction as the case may be, through the opening 13, 15 and 18 in the trap 2, and the metal piece 17 slides along the body 11 of the trap 2 thereby accommodating the lateral movement of the rod 3 in its upward or downward course. From the foregoing it is obvious that the trap is insect proof.

We claim:

An insect excluding device intended for use on greenhouse ventilators, comprising a body, the ends and sides of which are folded over, a metal slide within said body, and a gasket suitably fastened to the center of said metal slide, said body, slide and gasket having holes provided in the center thereof so as to permit of the passage therethrough of a ventilator arm, and one end of said body being provided with holes to permit attachment to greenhouse.

In testimony whereof, we affix our signatures in the presence of two witnesses.

EUGENE MAY, JR.
ROBERT J. BULLEN.
AUGUST VOIGT.

Witnesses:
JESSE O. JALLIFF,
ERNEST F. WILLIAMS.